United States Patent [19]
Hijiya et al.

[11] 3,872,228
[45] Mar. 18, 1975

[54] PROCESS FOR THE PREPARATION OF FOOD CONTAINING PULLULAN AND AMYLOSE

[75] Inventors: Hiromi Hijiya; Makoto Shiosaka, both of Okayama, Japan

[73] Assignee: Hayashibara Biochemical Laboratories, Incorporated, Okayama, Japan

[22] Filed: Jan. 14, 1974

[21] Appl. No.: 433,379

[30] Foreign Application Priority Data
Jan. 19, 1973  Japan................................. 48-8406

[52] U.S. Cl.................... 426/19, 426/343, 426/152, 426/213
[51] Int. Cl. ....................... A21d 13/02, A21d 13/06
[58] Field of Search .............. 426/343, 19, 213, 152

[56] References Cited
UNITED STATES PATENTS

| | | | |
|---|---|---|---|
| 3,023,104 | 2/1962 | Battista | 426/214 X |
| 3,541,587 | 11/1970 | Washburn | 426/138 X |

FOREIGN PATENTS OR APPLICATIONS

| | | | |
|---|---|---|---|
| 1,096,850 | 1/1961 | Germany | 195/31 P |

*Primary Examiner*—Raymond N. Jones
*Attorney, Agent, or Firm*—Hans Berman; Kurt Kelman

[57] ABSTRACT

The properties of foods such as adherence to the teeth, texture and appearance can be improved by mixing food material with pullulan and amylose, adding suitable subsidiary ingredients to the mixture and baking said mixture.

4 Claims, No Drawings

PROCESS FOR THE PREPARATION OF FOOD CONTAINING PULLULAN AND AMYLOSE

This invention relates to a process for the preparation of food containing pullulan and amylose, which is low in caloric value.

Pullalan is a polysaccharide with a structure different from that of starch and is water-soluble but not susceptible to hydrolysis by the various enzymes in the digestive tract. Thus the present inventors have discovered that the commonly used carbohydrates can be reduced as much as possible by replacing them with pullulan so as to reduce the caloric value of foods.

However, since pullulan is a viscous polysaccharide with a high water-solubility, its employment will yield foods with a slightly inferior texture. More particularly, as pullulan exhibits a high viscosity when it absorbs moisture, a tendency of adherence on the teeth to some extent, is noted with products in which pullulan is incorporated, e.g. breads, biscuits, cookies and other baked products.

The present inventors investigated various means to eliminate the disadvantage of pullulan, i.e. the fact it causes adherence to the teeth, and to utilize the properties of the non-toxic, noncaloric carbohydrate which has no foreign taste nor odor, and found that the addition of 30–170 percent of amylose to pullulan is extremely effective in eliminating the above disadvantages.

The present invention provides a process for the production of low-caloric foods by replacing the amylaceous ingredients or starchy substance with pullulan, whereby it is possible to apply pullulan satisfactorily in foods having desirable body, texture, and appearance, satisfactory mouth-touching, tooth-touching or biting properties as well as appetite satisfying properties and reduced caloric value.

So far, there was no known ingredient besides pullulan for baked products, which imparts to them the above characteristics.

The incorporation of pullulan with amylose not only eliminates the above disadvantages, but also improves the biting or tooth-touching properties of the resulting products to a very satisfactory degree. Hardly any difference was noted between the textures of the baked products, such as breads, biscuits and cookies, using as their main ingredients flour, pullulan and amylose, and those of the control products using flour alone.

The pullulan employable in accordance with the present invention is obtained by cultivating a pullulan-producing microorganism, for example *Pullularia pullulans* IFO 6353 or *Dematium pullulans* IFO 4464, on culture media containing sucrose, glucose, invert sugar, date extract, fructose and partial hydrolyzates of starch, or mixtures thereof as carbon source under aerobic conditions at a desirable yield, over 60 percent based on the sugar content. The molecular weight of the thus obtained pullulan will range from 10,000 to 5,000,000. However, in order to avoid the above mentioned adherence on the teeth it is preferable to use a low molecular weight pullulan, i.e. with a molecular weight less than 100,000, for preparing breads, biscuits, cookies and crackers.

The amylose which is incorporated together with flour and pullulan in baked products is a polysaccharide with alpha-1, 4-glucosidic linkages. Whereas the natural amylose which is present in flour has a degree of glucose polymerization (glucose DP) of over 500, the amylose which is employed in the present invention has a glucose DP range of 20 to 500 and consists mainly of amylose having relatively low molecular weight. Although there is some amylose present in flour, the glucose DP of the amylose contained in flour is different from that of the amylose of the invention and the amylose is capsulated in cells and tissues of the flour. The amylose employable in the invention is obtained by hydrolyzing starch with debranching enzyme, i.e. pullulanase or isoamylase, consists of linear molecules, and is essentially free from cells and tissues. Also amyloses obtained from aqueous solution of starch by n-butanol precipitation or precipitation with salts, or partial acidic and/or enzymatic hydrolyzates of the above amyloses, or high-amylose starch are employable in the invention. However, relatively low DP amylose gives the most favourable results.

The materials incorporated with pullulan and amylose in food according to the present invention include amylaceous or starchy substances such as cereal flours for example flours of wheat, corn, rice etc, starches of various origin and starch products.

They are usually kneaded with water, mixed with suitable subsidiary ingredients, such as gluten, calcium carbonate, sugar, salt, fats or oils, egg, powdered milk, maltitol, or yeast, baked or toasted in a heater to prepare baked products such as breads, biscuits and cookies.

The amount of amylose to be added to pullulan should be in the range of 30 to 170 percent of the pullulan weight, and it is preferable that the weight ratio of pullulan to starchy substance is between 2:1 and 1:5 and the amount of starchy substance is not smaller than 20 percent of the combined amount of starchy substance, pullulan and amylose.

The main ingredients of the present invention must be mixed in the above ratios to obtain a texture similar to that of the control product.

Since the absorption ratio of amylose in vivo was determined to be about 50 to 60 percent, the absorption ratio was assumed to be 60 percent in the subsequent calorie calculations. Therefore the incorporation of amylose will not result in a great increase in caloric values of the product. The addition of amylose tends to harden the structure of baked products, breads and biscuits, but the tendency can be prevented by addition of wheat gluten. The addition of gluten or calcium carbonate also contributes to improvements of the textures and biting properties of the products.

As illustrated in the appended examples, in the preparation of breads, biscuits, cookies and crackers in which pullulan and amylose are also used as main ingredients, there is no need to use any specific manufacturing procedure. In preparing a dough for bread, for instance, with the listed main and subsidiary ingredients with an addition of water, it is required to adjust the amount of water to a suitable range since pullulan will elevate the viscosity of the dough compared to conventional dough. Also, one has to prolong properly the retention time of the fermentation stages, and the expansion degree of the dough during the fermentation stages for products with desirable textures, and baked colors equivalent to those of the conventional products. Breads with very satisfactory taste and flavour are obtained. Also in the production of biscuits and crackers, no special caution if necessary except that the amount of water should be decreased as compared to usual methods in order to regulate the viscosity of the dough. The dough is baked according to the conventional method to a baked colour. With the combination of main ingredients and the adjustment of hardness of the dough, desirable properties, such as satisfactory taste, flavour, appearance and inner textures, can be imparted to the products. The caloric value of the baked products prepared according to the invention will vary to some extent depending on the amounts of subsidiary ingredients, especially fats, and the caloric value can be reduced to about 40 to 80 percent of the control products. When less than 50 percent of rice is replaced with pullulan and 30 to 100 percent of amylose against pullulan is added to the mixture, low-caloric, crisp rice-cakes, crackers and biscuits with satisfactory biting properties are obtained.

The invention will be illustrated further in the following examples. All percentages are given by weight/weight, except those which refer to calorie.

EXAMPLE 1.

Preparation of a low-caloric bread.

Table I.

Examples of ingredients for two rolls and comparison of caloric values.

| Sample | A | B | C | D |
|---|---|---|---|---|
| Pullulan mixing ratio (%) | 0 | 30 | 30 | 35 |
| Amylose mixing ratio(%) | 0 | 30 | 40 | 30 |
| Main ingredients: | | | | |
| Thick-boiling flour (or bread flour) (g) | 30 | 12 | 9 | 10.5 |
| Pullulan (g) | — | 9 | 9 | 10.5 |
| Amylose (g) | — | 9 | 12 | 9 |
| Subsidiary ingredients: | | | | |
| Margarine (g) | 6 | 6 | 6 | 6 |
| Sucrose (g) | 2.5 | 2.5 | 2.5 | 2.5 |
| Egg (g) | 6 | 6 | 6 | 6 |
| Table salt (g) | 0.4 | 0.4 | 0.4 | 0.4 |
| Water (ml) | 8 | 6 | 6.5 | 6 |
| Fermentation source: | | | | |
| Dry yeast (g) | 0.8 | 0.8 | 0.8 | 0.8 |
| Sucrose (g) | 0.4 | 0.4 | 0.4 | 0.4 |
| Water (ml) | 4 | 4 | 4 | 4 |
| Comparison of caloric value | | | | |
| Caloric from main ingredients (%) | 100 | 58 | 54 | 53 |
| Total caloric (%) | 100 | 73.5 | 70.9 | 70.4 |
| Caloric of two rolls (cal.) | 84.1 | 61.8 | 59.7 | 59.2 |

Process for rolls of bread (the so-called "sponge-dough method")

The whole amylose and a portion of the thick-boiling flour were mixed together to bring the amount of the mixture to 60 percent of the main ingredients. After mixing with water in a kneader, the subsidiary ingredients and fermentation source were added thereto to yield a dough with an appropriate softness. The first stage of fermentation was carried out at 30°C for 60 minutes during which the dough was degassed, whereupon 40 percent of the main ingredients, i.e. the remaining flour and pullulan were added to the dough, and the mixture was mixed uniformly adding water thereto to adjust its softness. The second stage of fermentation was carried out in a refrigerator for 60 minutes. After subjecting the dough to the third stage of fermentation at 35°C for 30 minutes, the dough was degassed and moulded. Thereafter the dough was subjected to the fourth stage of fermentation at 35°C for 30 minutes and then baked in an oven at 210°C for 20 minutes.

Samples B, C and D showed a slightly darker crust compaired with the control sample A, but their crumbs were finely grained and possessed a uniform structure similar to that of A, they had no foreign taste, flavour or odor. The three samples were, however, slightly bland in their tastes. Each sample hardly adhered to the teeth. Sample C in which 40 percent of flour was replaced with amylose had a slightly harder crust, but had the most desirable mouth-touching property among the four samples. As shown in Table 1 the caloric values of samples B, C and D were reduced to about 70–74 percent of that of sample A. Especially the caloric value resulting from the main ingredients were reduced to 53–58 percent by the employment of pullulan, and this fact proves the efficacy of the products as low-caloric foods.

EXAMPLE 2.

Preparation of cocoa biscuits.

Biscuits prepared by replacing 30–40 percent of flour with pullulan and additional 30–40 percent of flour with amylose were compared with a control product which was prepared by using only flour as the main ingredient.

Table II.

Example of ingredients for cocoa biscuits (seven pieces) and comparison of caloric values.

| Sample | Use of the commonly prescribed amount of margarine | | | | Use of half of the commonly prescribed amount of margarine | | |
|---|---|---|---|---|---|---|---|
| | A | B | C | D | B' | C' | D' |
| Pullulan mixing ratio(%) | 0 | 30 | 30 | 40 | 30 | 30 | 40 |
| Amylose mixing ratio(%) | 0 | 30 | 40 | 30 | 30 | 40 | 30 |
| Main Ingredients: | | | | | | | |
| Thin-boiling flour(g) | 30 | 12 | 9 | 9 | 12 | 9 | 9 |
| Pullulan(g) | — | 9 | 9 | 12 | 9 | 9 | 12 |
| Amylose(g) | — | 9 | 12 | 9 | 9 | 12 | 9 |
| Subsidiary Ingredients: | | | | | | | |
| Margarine(g) | 10 | 10 | 10 | 10 | 5 | 5 | 5 |
| Sucrose(g) | 7.5 | — | — | — | — | — | — |
| Maltitol(g) | — | 19.7 | 19.7 | 19.7 | 19.7 | 19.7 | 19.7 |
| Egg(g) | 2.4 | 2.4 | 2.4 | 2.4 | 2.4 | 2.4 | 2.4 |
| Skim powder milk(g) | 1.5 | 1.5 | 1.5 | 1.5 | 1.5 | 1.5 | 1.5 |
| Cocoa(g) | 1.5 | 1.5 | 1.5 | 1.5 | 1.5 | 1.5 | 1.5 |
| Table salt(g) | 0.4 | 0.4 | 0.4 | 0.4 | 0.4 | 0.4 | 0.4 |
| Baking powder(g) | 0.3 | 0.3 | 0.3 | 0.3 | 0.3 | 0.3 | 0.3 |
| Vanilla essence | + | + | + | + | + | + | + |
| Water (ml) | 6.5 | 2.5 | 3.5 | 3.5 | 3 | 3.5 | 4 |
| Comparison of caloric-value | | | | | | | |
| Caloric from main ingredients(%) | 100 | 45.6 | 42.6 | 37.7 | 45.6 | 42.6 | 37.7 |
| Total caloric(%) | 100 | 66.2 | 64.3 | 61.4 | 49.7 | 47.7 | 44.9 |
| Caloric of seven biscuits (cal.) | 218.0 | 144.3 | 140.1 | 133.7 | 108.4 | 104.2 | 97.8 |

+ indicates "small amount".

At first, margarine, sucrose or maltitol, and egg were mixed and kneaded to a creamy state. To the mixture were added the main ingredients after sifting and then the remaining subsidiary ingredients, and after mixing and adding water thereto the mixture was prepared into a dough which was as soft as the ear-lobe. After rolling out the dough to a plate about 6mm thick the spread dough was cut into desired size and shape. The pieces were baked in an oven adjusted to 150°C for 15 minutes. Each of the baked products had a desirable baked-colour and there was found no difference in comparison with the control product A. The samples also had a superior inner structure and a crispness or biting property equal to those of the control and did not adhere to the teeth similarly as the control. The replacement of 30 percent and 40 percent of flour with pullulan and amylose resulted in no difference in the properties of the final product. As apparent from Table II, the incorporation of amylose and pullulan reduced the caloric value of the main ingredients to about 38–46 percent, and the total caloric value in the low-fat-content product was restricted to not higher than 50 percent, thus a low-caloric biscuit was obtained with the only exception that the low-fat-content product was a little harder than the other products.

EXAMPLE 3.

Preparation of soda cracker.

In this example, soda crackers were prepared using ingredients mixed in the mixing ratio described in Examples 1 and 2 and the mixing ratios of pullulan and amylose were varied as listed in Table III. The products thus prepared were compared with the control product prepared by the usual method.

Table III.

Examples of ingredients for soda crackers (25 pieces) and comparison of caloric values.

| Sample | A | B | C | D |
|---|---|---|---|---|
| Pullulan(%) | 0 | 30 | 30 | 30 |
| Amylose(%) | 0 | 30 | 40 | 50 |
| Main Ingredients: | | | | |
| Moderate-boiling flour(g) | 30 | 12 | 9 | 6 |
| Pullulan(g) | — | 9 | 9 | 9 |
| Amylose(g) | — | 9 | 12 | 15 |
| Subsidiary ingredients: | | | | |
| Margarine(g) | 3 | 3 | 3 | 3 |
| Table salt(g) | 0.7 | 0.7 | 0.7 | 0.7 |
| Sodium bicarbonate(g) | 0.2 | 0.2 | 0.2 | 0.2 |
| Baking powder(g) | 0.6 | 0.6 | 0.6 | 0.6 |
| Water(g) | 13 | 12 | 12 | 12 |
| Comparison of caloric-value | | | | |
| Caloric from main ingredients(g) | 100 | 58 | 54 | 50 |
| Total calorie(%) | 100 | 65 | 61 | 57 |
| Calorie of 25 crackers (cal.) | 128 | 83 | 79 | 75 |

After mixing thoroughly the main and subsidiary ingredients, the mixture was made into a dough with an appropriate hardness by kneading the mixture with water. Then the dough was rolled out to a plate about 2 mm thick, shaped with a cookie press or cutter and baked in an oven at 150°C for 15 minutes. There was no difference among products B, C and control A, and these products B and C were crisp and had a satisfactory biting property as A. They had also no tendency to adhere to the teeth. Although product D was superior in its crispness or biting property it was, to some extent, harder than the other products.

EXAMPLE 4.

Preparation of cocoa biscuits.

Cocoa biscuits were prepared using the ingredients of B',C' and D' as described in Example 2 with the exception that 1 percent of calcium carbonate was added to each sample and the amounts of water were varied to 3ml, 4ml, and 4.5ml, respectively. Each of the products was crisp, and had desirable biting property with lower adherence to the teeth and improved structure and texture. Thus their caloric values could be reduced to less than 50 percent of the control product.

EXAMPLE 5.

Preparation of low-calorie bread.

Four batches were prepared by replacing 30 to 40 percent of flour with pullulan and amylose, respectively, as described in Table I of Example 1. 0, 7, 14 and 21 percent of wheat gluten based on the main ingredients were added to the mixture, the other ingredients were used as illustrated in Example 1 and the mixture was fermented according to the process of Example 1. The incorporation of the wheat gluten resulted in lower adherence to the teeth and improvement of hardness of the products and, moreover, in reducing their total calories to less than 70–80 percent of the conventional products.

What is claimed is:

1. A method of preparing a baked food which comprises:
   a. mixing cereal flour, amylose having 20 to 500 glucose units per molecule, and pullulan with enough water to form a dough,
      1. the weight ratio of said pullulan to said flour in said dough being between 2:1 and 1:5,
      2. the amount of said amylose in said dough being between 30 to 170 percent of the weight of said pullulan; and
   b. baking said dough.

2. A method as set forth in claim 1, wherein said flour amounts to not less than 20 percent of the combined weight of said flour, said pullulan, and said amylose.

3. A method as set forth in claim 1, wherein said pullulan has a molecular weight of 10,000 to 100,000.

4. A method as set forth in claim 1, wherein said flour, said amylose, and said pullulan are mixed with at least one subsidiary ingredient selected from the group consisting of gluten, calcium carbonate, sugar, salt, fat, oil, egg, powdered milk, maltitol, and yeast prior to said baking.

* * * * *